United States Patent [19]

Foster

[11] Patent Number: 5,390,781
[45] Date of Patent: Feb. 21, 1995

[54] MOUNTING ASSEMBLY AND METHOD FOR RECIPROCATING SLAT CONVEYOR

[76] Inventor: Raymond K. Foster, P.O. Box 1, Madras, Oreg. 97741

[21] Appl. No.: 164,895

[22] Filed: Dec. 9, 1993

Related U.S. Application Data

[63] Continuation-in-part of Ser. No. 54,533, Apr. 28, 1993, Pat. No. 5,360,054, and Ser. No. 54,530, Apr. 28, 1993, Pat. No. 5,325,763.

[51] Int. Cl.[6] ............................................. B65G 25/00
[52] U.S. Cl. .................................................... 198/750
[58] Field of Search ............... 198/750; 414/525.1, 414/525.9; 403/141, 142, 143

[56] References Cited

U.S. PATENT DOCUMENTS

| | | | |
|---|---|---|---|
| 4,712,467 | 12/1987 | Foster | 91/176 |
| 4,748,893 | 6/1988 | Foster | 91/176 |
| 4,748,894 | 6/1988 | Foster | 91/176 |
| 4,793,469 | 12/1988 | Foster | 414/525.9 X |
| 4,817,783 | 4/1989 | Foster | 198/750 |
| 4,821,868 | 4/1989 | Foster | 198/750 |
| 4,907,691 | 3/1990 | Foster | 198/750 |
| 4,962,848 | 10/1990 | Foster | 414/525.1 X |
| 4,969,387 | 11/1990 | Foster | 91/176 |
| 5,096,356 | 3/1992 | Foster | 414/325 |
| 5,125,502 | 6/1992 | Foster | 198/750 |
| 5,165,524 | 11/1992 | Foster | 198/750 |
| 5,193,661 | 3/1993 | Foster | 198/750 |
| 5,255,712 | 10/1993 | Foster | 137/522 |

FOREIGN PATENT DOCUMENTS 0340874  11/1989  European Pat. Off. ............. 198/750

Primary Examiner—Cheryl L. Gastineau
Attorney, Agent, or Firm—Joan H. Pauly; Delbert J. Barnard

[57] ABSTRACT

A drive frame assembly includes opposite transverse drive frame members (64), each of which includes a metal plate (66) with a central portion having a plurality of longitudinal corrugations (68). The central portion is stiffened by transverse beams (78, 80). A plurality of piston-cylinder drive units each have opposite ball ends (24, 26) which are secured to end portions of the corrugations by means of ball blocks (50, 52). Opposite side portions of the metal plate (66) are free to bend relative to the central portion to accommodate variations in vertical spacing of the drive units relative to portions of the main frame of a structure in which the conveyor is mounted.

49 Claims, 10 Drawing Sheets

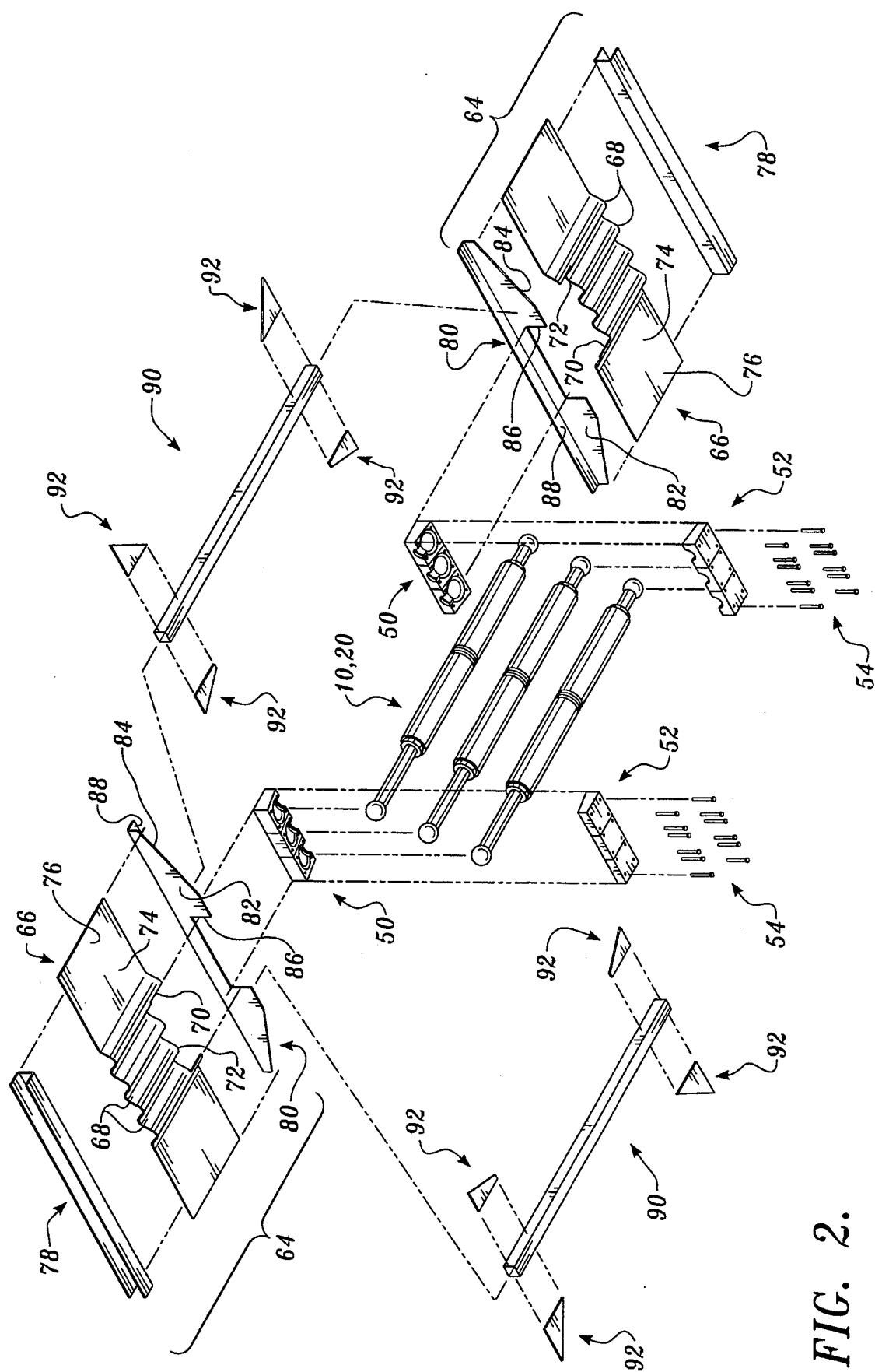

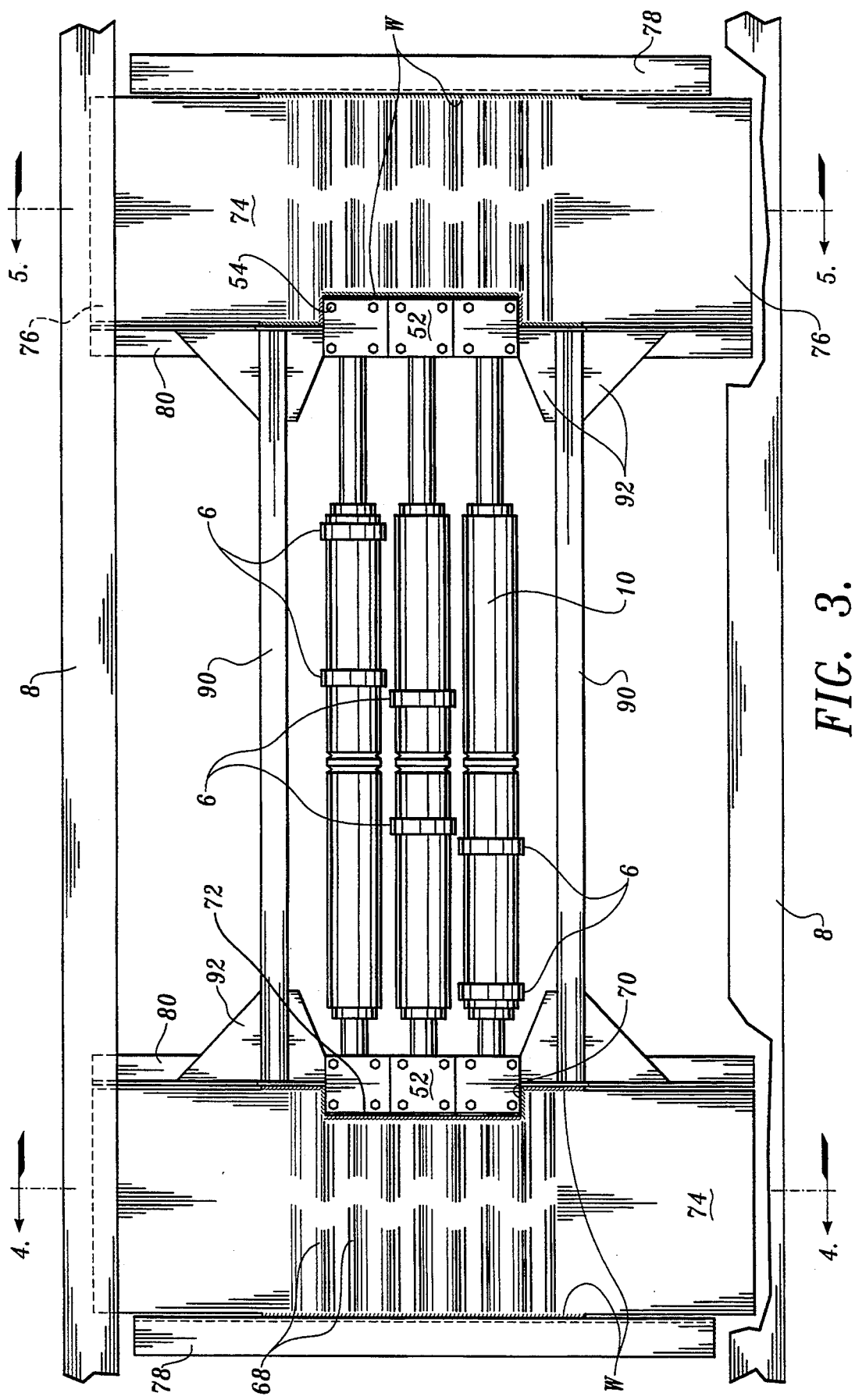

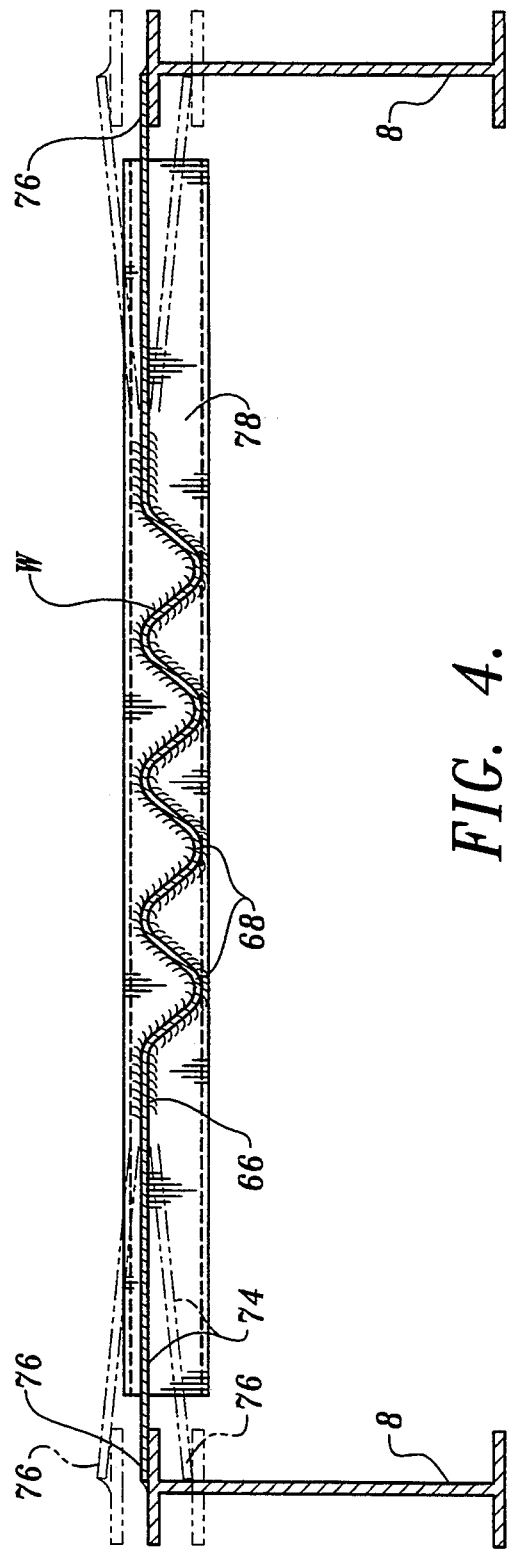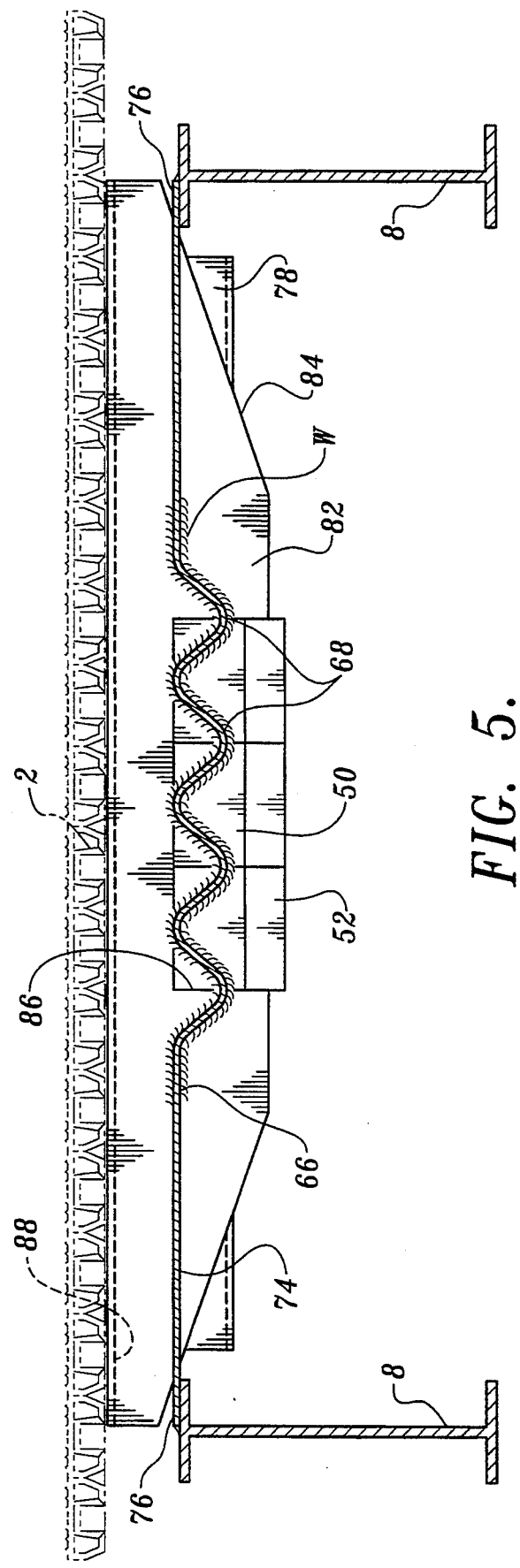

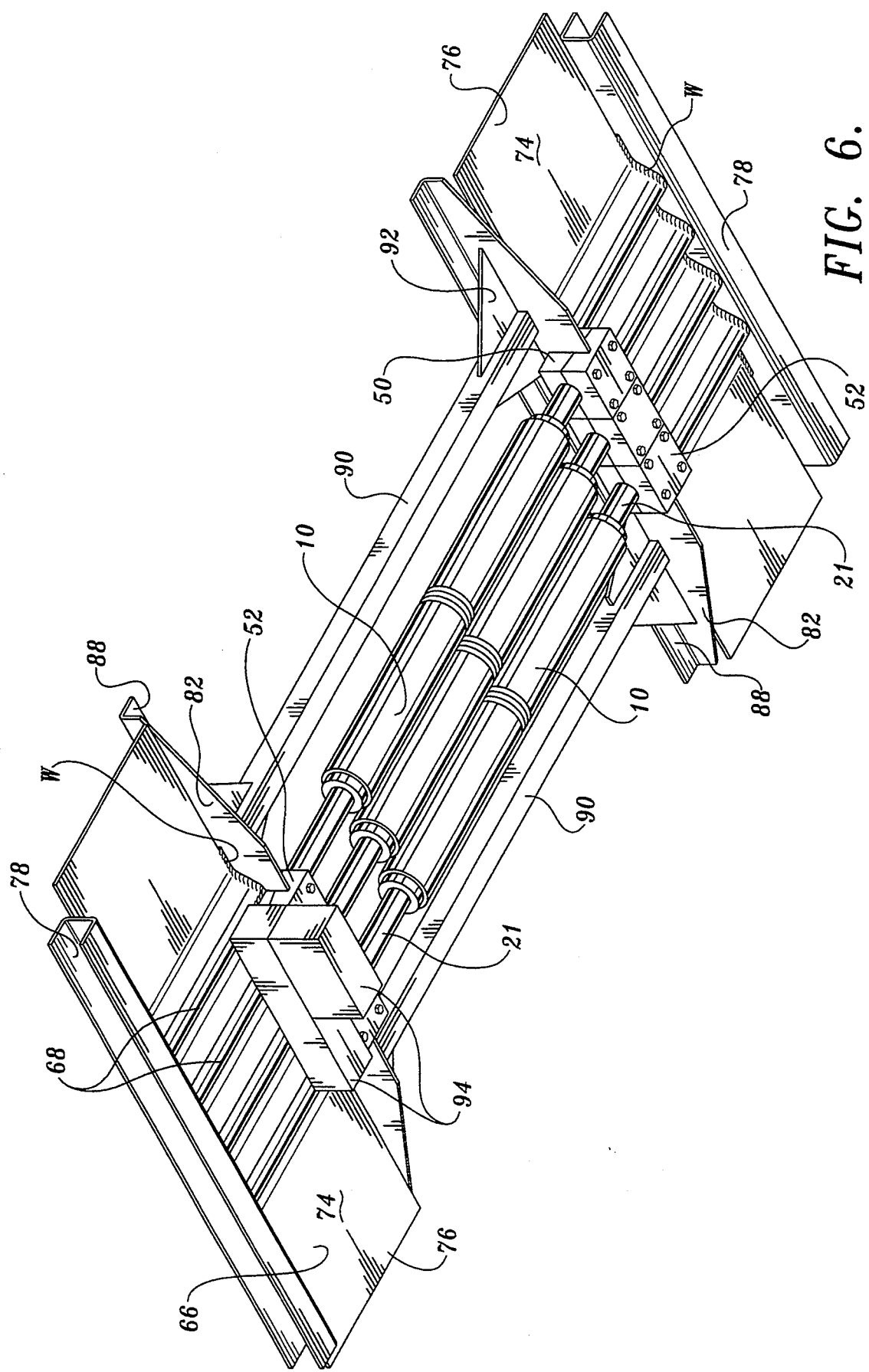

MOUNTING ASSEMBLY AND METHOD FOR RECIPROCATING SLAT CONVEYOR

This application is a continuation-in-part of U.S. Ser. No. 08/054,533, filed Apr. 28, 1993, and entitled "Ball Block For Mounting Linear Motor" U.S. Pat. No. 5,350,054, and U.S. Ser. No. 08/054,530, U.S. Pat. No. 5,525,763 filed Apr. 28, 1993, and entitled "Internal Check Valve".

TECHNICAL FIELD

This invention relates to systems for mounting reciprocating slat conveyors and the drive assemblies thereof and, more particularly, to such a system in which a drive frame assembly has a transverse drive frame member with a strengthened central portion to which the end of a drive unit is secured, and opposite side portions that are bendable relative to the central portion to permit adjustment of the vertical position of the outer ends of the side portions relative to the drive unit when the assembly is mounted on a structure.

BACKGROUND INFORMATION

Reciprocating slat conveyors are used in various types of installations and may be mounted on different kinds of structures. One example of a structure into which a reciprocating slat conveyor may be incorporated is a trailer. Reciprocating slat conveyors are typically mounted on an existing trailer or other structure, rather than being manufactured together with the structure itself as an original part of the structure. Therefore, it is desirable for a conveyor to be relatively easy to mount onto a structure and have some flexibility in adjusting to variations in the dimensioning of the structure. Ease and flexibility in mounting is preferably accomplished while also achieving and/or maintaining compactness and strength in the drive assembly of the conveyor.

Drive frame assemblies for reciprocating slat conveyors are disclosed in my U.S. Pat. No. 4,712,467, granted Dec. 15, 1987; U.S. Pat. No. 4,748,893, and U.S. Pat. No. 4,748,894, both granted Jun. 7, 1988; and U.S. Pat. No. 4,821,868, granted Apr. 18, 1989. Each of these patents shows an assembly having opposite end frame members to which the opposite ends of drive units are secured. The use of ball blocks that receive the ball ends of drive units to mount the drive units onto drive frame members is illustrated in my U.S. Pat. No. 4,817,783, granted Apr. 4, 1989; U.S. Pat. No. 4,969,389, granted Nov. 13, 1990; U.S. Pat. No. 5,096,356, granted Mar. 17, 1992; U.S. Pat. No. 5,125,502, granted Jun. 30, 1992; U.S. Pat. No. 5,165,524, granted Nov. 24, 1992; and U.S. Pat. No. 5,193,661, granted Mar. 16, 1993.

SUMMARY OF THE INVENTION

A subject of the invention is a reciprocating slat conveyor comprising a plurality of conveyor slats and a conveyor drive for moving the slats in a first direction, for conveying a load, and for retracting the slats in the opposite direction. The conveyor drive includes a piston-cylinder drive unit positioned below the conveyor slats. The drive unit includes a movable portion connected to the slats and a fixed portion having a mounting end part. A main frame is positioned below the conveyor slats. A transverse drive frame member is positioned below the slats and is connected to the main frame. The transverse drive frame member has a central portion and opposite side portions extending laterally outwardly from the central portion, each to an outer end. The mounting end part of the drive unit is connected to the central portion of the transverse drive frame member.

The opposite side portions of the transverse drive frame member are preferably bendable in position relative to the central portion of the frame member to permit adjustment of the vertical position of the outer ends to accommodate variations in vertical spacing of the drive unit relative to portions of the main frame that are connected to the outer ends. In its preferred form, the transverse drive frame member includes a generally horizontal metal plate having a central portion provided with a plurality of strengthening ribs extending longitudinally of the conveyor, and opposite side portions that form said opposite side portions of the transverse drive frame member. The ribs are preferably provided by forming the metal plate to include a plurality of corrugations extending longitudinally of the conveyor generally in line with the drive units. The corrugations have end portions confronting and connected to the mounting end part of the drive unit. The corrugations carry axial drive forces generated by the drive unit. In conveyors with a plurality of drive units, a mounting end part of each of the drive units is preferably connected to the end portions of the corrugations.

The conveyor may be provided with additional features. A preferred additional feature is a stiffening beam firmly connected to end portions of the corrugations for stiffening the corrugations and the central portion of the metal plate. Preferably, the corrugations are positioned longitudinally between two such transverse beams. The side portions of the plate remain free of connection to the transverse beam or beams so that they are bendable in position relative to the corrugations and the transverse beams.

The mounting end part of the drive unit may be connected to the transverse drive frame member in various ways. The preferred manner of connection comprises providing the drive unit with a ball end, positioning the ball end in a cavity in a ball block, and firmly connecting the ball block to the transverse drive frame member. This preferred type of connection has the advantage of being a secure connection that efficiently transmits loads and that also permits some lateral adjustment of the relative positions of the drive units and the transverse drive frame member to compensate for misalignments between the drive unit axis and the conveyor slats.. When the ball block is connected to the central portion of a metal plate, it also serves to stiffen the central portion. In the preferred embodiment of the conveyor, both ends of each drive unit are provided with a ball end that is mounted to an end frame member by means of a ball block. In addition, the ball blocks at one end of the drive units each include a plurality of passageways for delivering fluid pressure to, and returning fluid pressure from, the ball end, for moving the conveyor slats in the first direction and retracting the conveyor slats in the opposite direction.

Another subject of the invention is a method of mounting a reciprocating slat conveyor on a structure, said structure including a main frame having laterally spaced apart portions. The method comprises providing a conveyor drive including a piston-cylinder drive unit having a movable portion and a fixed portion with a mounting end part. A drive frame is also provided and includes a transverse drive frame member having a central portion and opposite side portions extending laterally outwardly from the central portion, each to an outer end. The method includes stiffening the central portion of the transverse drive frame member, but allowing the side portions to be bendable in position relative to the central portion to permit vertical adjustment of the outer ends of the side portions relative to the central portion. The mounting end part of the drive unit is connected to the central portion. The outer ends of the side portions are connected to the spaced apart portions of the main frame. When the outer ends are being connected, they are positioned vertically to bring them into engagement with the spaced apart portions. A plurality of conveyor slats are positioned above the drive unit, the main frame, and the transverse drive frame member and are connected to the movable portion of the drive unit.

The method preferably further includes one or more preferred features. Such features include providing the transverse drive frame member in the form of a corrugated metal plate and stiffening the central portion of the plate with one or more transverse beams, as described above. They also include connecting the mounting end part of the drive unit to the transverse drive frame member by means of a ball block, also as described above.

Another subject of the invention is a drive frame assembly for a reciprocating slat conveyor. According to an aspect of the invention, the assembly comprises a drive frame and a conveyor drive for moving conveyor slats in a first direction, for conveying a load, and for retracting the conveyor slats in the opposite direction. The drive frame includes first and second transverse drive frame members, which are longitudinally spaced apart. Each of these frame members includes a generally horizontal metal plate having a central portion and opposite side portions extending laterally outwardly from the central portion, each to an outer end. The frame member has stiffening portions that stiffen the central portion of the metal plate. The conveyor drive includes a plurality of separate piston-cylinder drive units. Each drive unit includes a movable portion and a fixed portion. The movable portion is connectable to a set of conveyor slats. The fixed portion has a first mounting end part and a second mounting end part opposite the first mounting end part. The first and second mounting end parts are connected to the central portions of the metal plates of the first and second frame members, respectively. The opposite side portions of each metal plate are bendable in position relative to the central portion of the plate to permit adjustment of the vertical positions of the outer ends relative to the drive units when the assembly is mounted on a structure by securing the outer ends to portions of the structure.

According to another aspect of the invention, the drive frame assembly comprises a drive frame having first and second longitudinally spaced transverse drive frame members connected to each other by a pair of laterally spaced longitudinal drive frame members, and a conveyor drive for moving conveyor slats in said first and opposite directions. The drive includes a plurality of separate piston-cylinder drive units. The movable portion of each drive unit is connectable to a set of conveyor slats. Its fixed portion has opposite ball ends. Each ball end is received in a ball block that is firmly connected to the respective transverse drive frame member, to secure each drive unit to both transverse drive frame members. Preferably, the transverse drive frame members have stiffened central portions and bendable side portions, as described above.

In the system of the invention, the various features result in ease and flexibility in mounting the conveyor drive assembly onto a structure, compactness and strength in the drive assembly, and simplicity of structure and ease of maintenance of the drive assembly. The preferred feature of the corrugated metal plate with bendable side portions is a simple structure but achieves a strong mounting for the drive units as well as flexibility in mounting the drive assembly. When ball blocks are used in combination with the corrugated metal plate, they efficiently transmit loads to the corrugated central portion of the plate to carry the axial drive forces generated by the drive units. The preferred stiffening of the central corrugated portion is also accomplished relatively simply in the preferred embodiment by the use of a pair of transverse beams. The overall result is a cost effective drive frame assembly for a slat conveyor that is easily incorporated into a structure onto which the conveyor is to be mounted.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 2 is an exploded pictorial view of the assembly shown in FIG. 1 but including the motors.

FIG. 3 is a bottom plan view of the assembly shown in FIGS. 1–2A, with the clamps that connect the motors to the transverse drive beams added.

FIG. 4 is a sectional view taken along the line 4—4 in FIG. 3 and illustrating in phantom the bending of the side portions of the metal plate.

FIG. 5 is a sectional view taken along the line 5—5 in FIG. 3 with a plurality of conveyor slats shown in phantom.

FIG. 6 is like FIG. 1 except that it also includes the motors and the hydraulic manifold.

BEST MODE FOR CARRYING OUT THE INVENTION

The drawings illustrate the preferred embodiment of the invention and the best mode for carrying out the invention currently known to the applicant. A major focus of the invention is the drive frame assembly, the preferred embodiment of which is shown in FIGS. 1–8.

Figure 9:
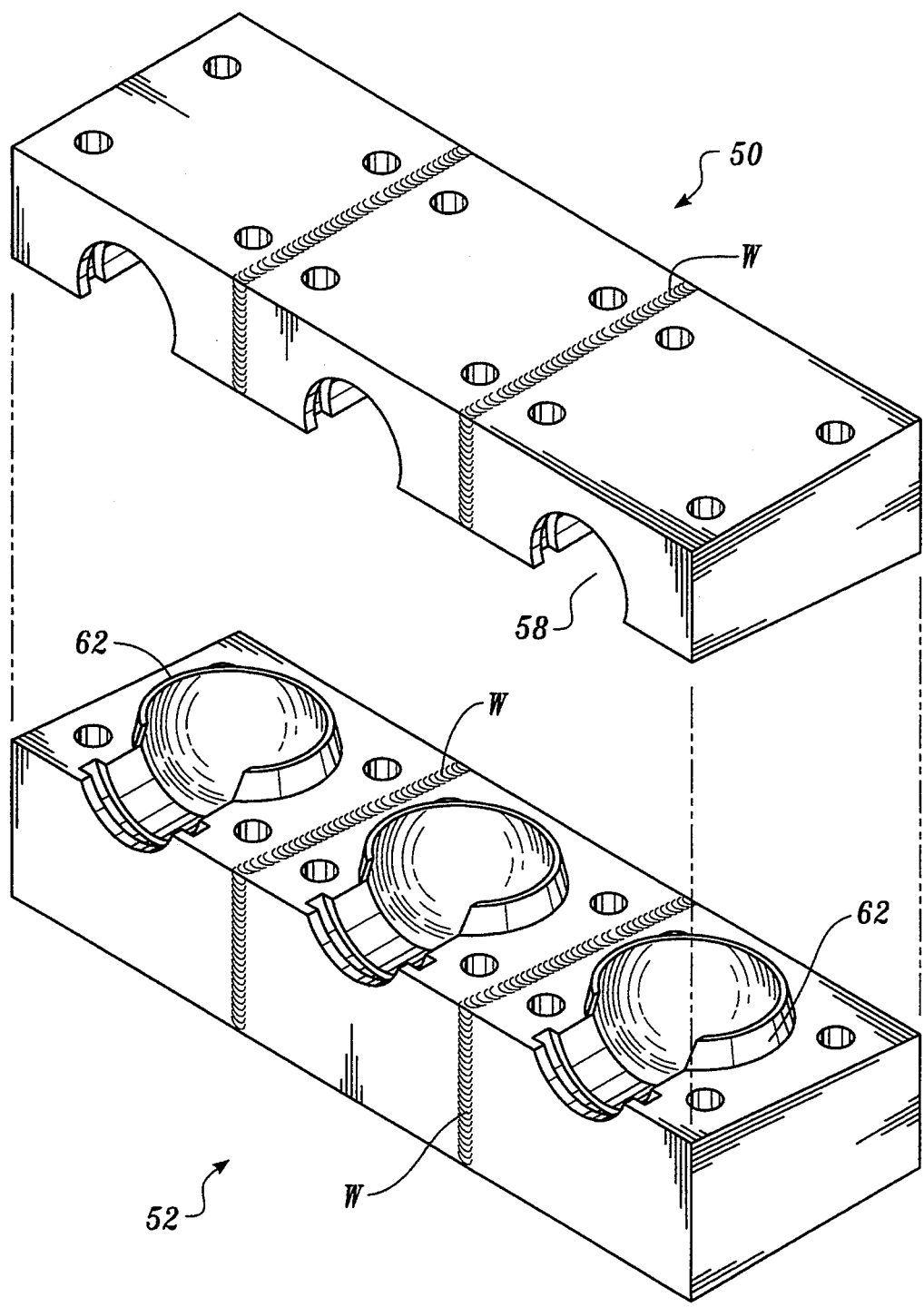
FIG. 9 is an exploded pictorial view of the preferred embodiment of a set of three ball blocks.
Figure 10:
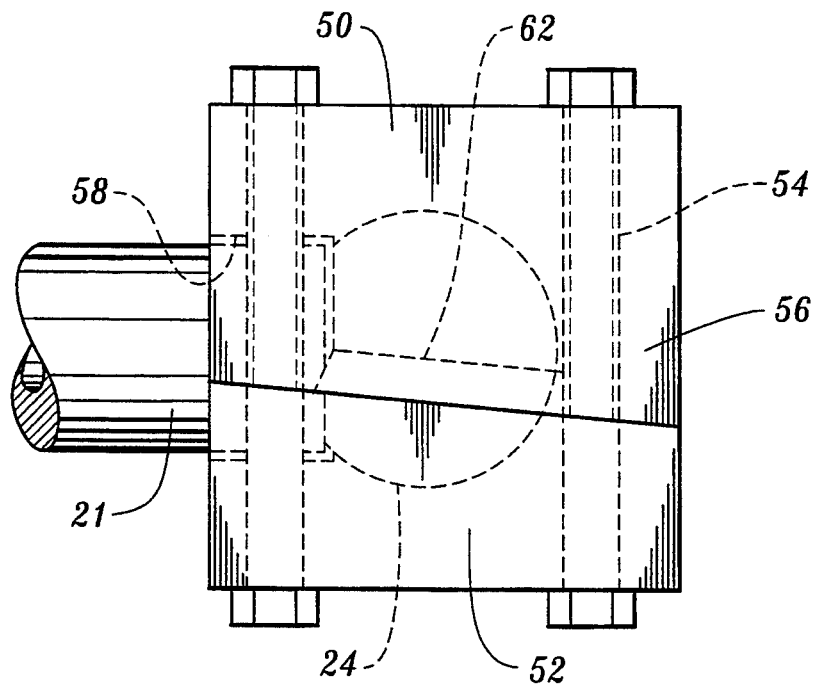
FIG. 10 is a side elevational view of the one of the ball blocks as shown in FIG. 9 with a ball end received therein.
Figure 11:
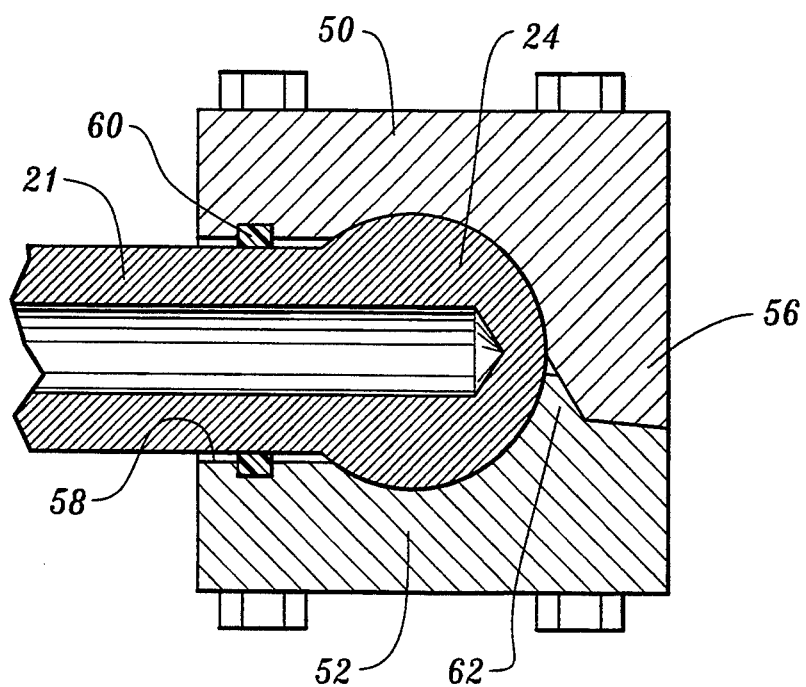
FIG. 11 is a sectional view of the ball block and ball end shown in FIG. 10, with the fasteners and ball block passageways omitted.

FIGS. 9–11 illustrate the preferred embodiment of the ball block of the drive assembly.

The invention encompasses a reciprocating slat conveyor comprising a plurality of conveyor slats 2. The conveyor slats 2 may take various forms. Since the details of the structure of the slats 2 are not a part of the present invention, the slats 2 are shown schematically in FIGS. 5 and 7. The slats are preferably provided in a plurality of sets, with the preferred number of sets being three.

The conveyor has a drive unit comprising a piston-cylinder hydraulic motor 10, 20 for each set of slats 2. In the preferred operation of the conveyor, the movable portions of all three motors 10, 20 are moved in a first direction in unison to convey a load. Then, the movable portions of the motors are moved in an opposite direction, one at a time, for returning the slats to a start position, one-third of the slats at a time. This operational sequence is known and is described in my U.S. Pat. No. 5,193,661, cited above.

The conveyor also includes a transverse drive beam 4 for each set of slats 2. See FIG. 8. In the conveyor illustrated in the drawings, there are three transverse drive beams 4 each of which is connected to its corresponding motor 10, 20 by clamps 6. Each transverse drive beam 4 is also connected to each slat 2 in its set of slats. Thus, the beam 4 transmits movement of the motor 10, 20 to movement of the slats 2. The details of the structure of the beams 4 and the manner of their connections to the slats 2 and the motors 10, 20 form no part of the present invention and may be varied considerably without departing from the spirit and scope of the invention. Preferably, the beams 4 are positioned close together above the motors 10, 20 and are connected to the motors 10, 20 in the manner shown in FIG. 8 and in my U.S. Pat. No. 4,821,868, cited above.

Referring to FIGS. 1–8, the drive frame assembly comprises a drive frame and a conveyor drive for moving the conveyor slats 2 as described above. The conveyor drive includes at least one drive unit and preferably includes three separate piston-cylinder drive units, one for each set of conveyor slats 2. The drive units can be seen in FIGS. 2, 2A, 3, and 6–8. Each drive unit comprises a hydraulic motor having a movable portion and a fixed portion. In the illustrated embodiment of the conveyor drive, the cylinder 10 of each motor is movable and is mounted on a fixed piston 20. In each motor, there are two separate piston heads 22, and the cylinder 10 is divided into two sections, to increase the effective pressure surface area of the motor while maintaining a relatively small motor diameter. This type of two-part motor is disclosed in my U.S. Pat. No. 4,748,893, cited above.

Figure 1:
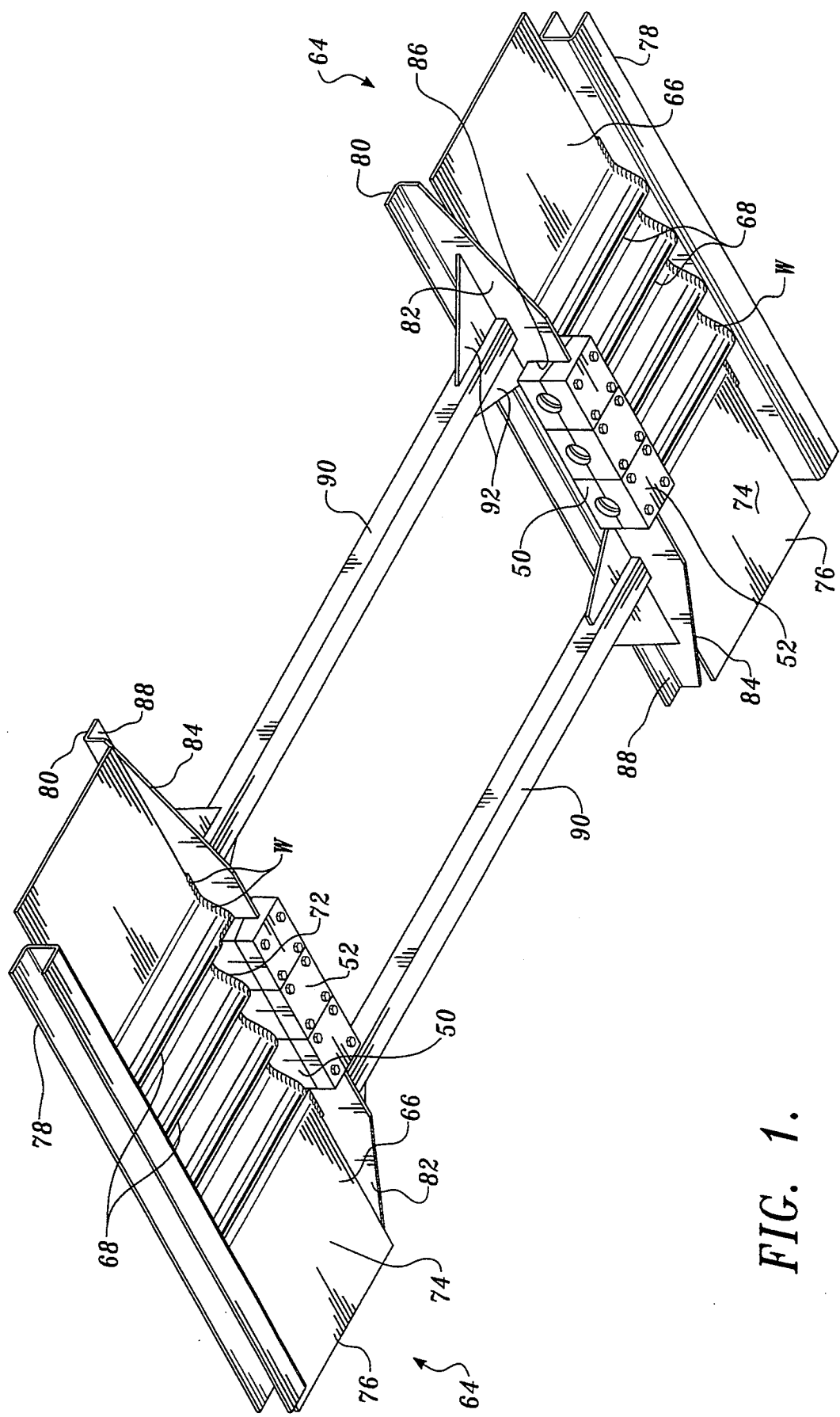
FIG. 1 is a pictorial view looking up at the preferred embodiment of the drive frame assembly of the invention, excluding the linear reciprocating motors thereof.
Figure 2A:
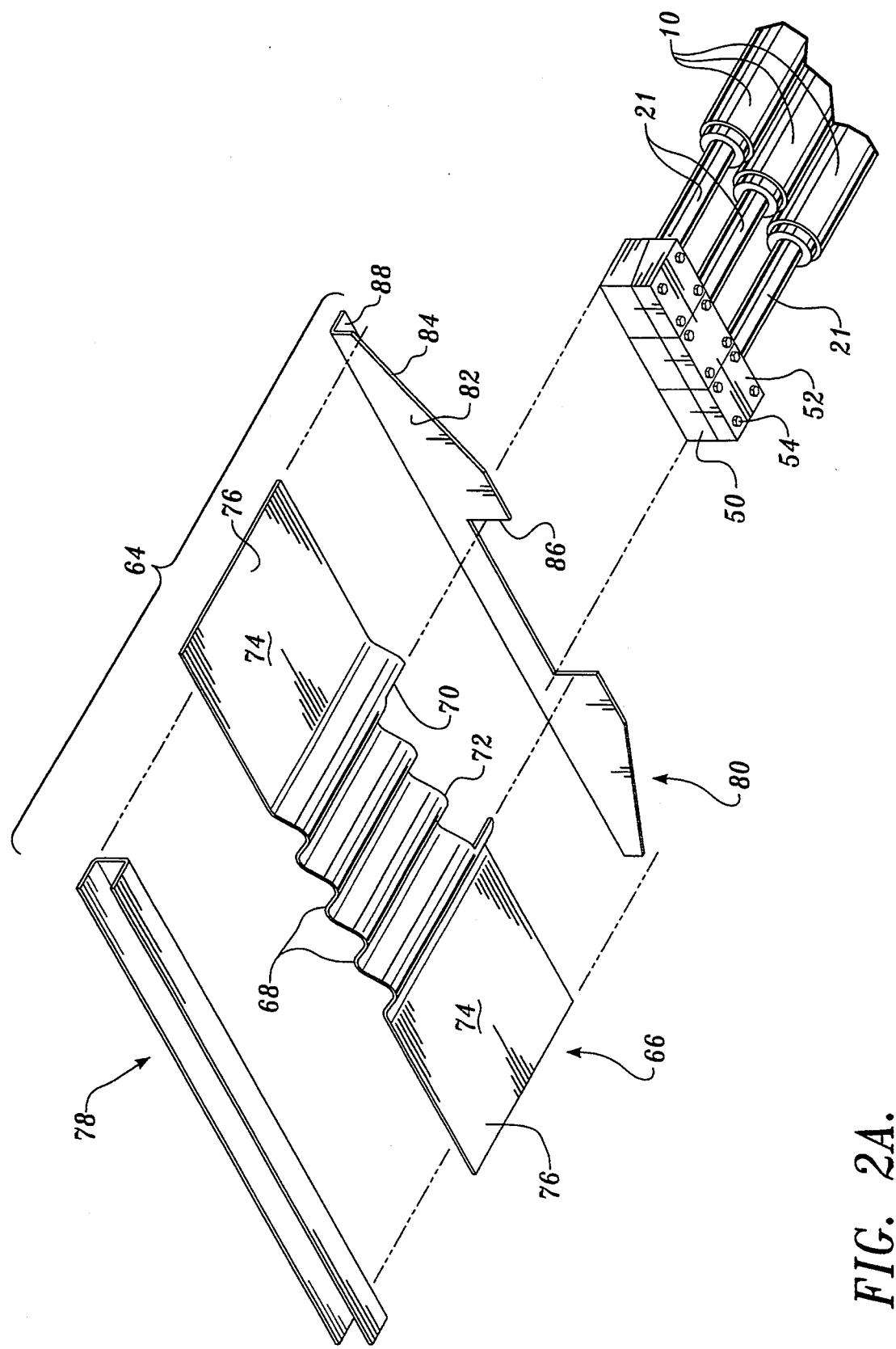
FIG. 2A is an enlarged pictorial view of one end portion of the assembly shown in FIG. 2.
Figure 7:
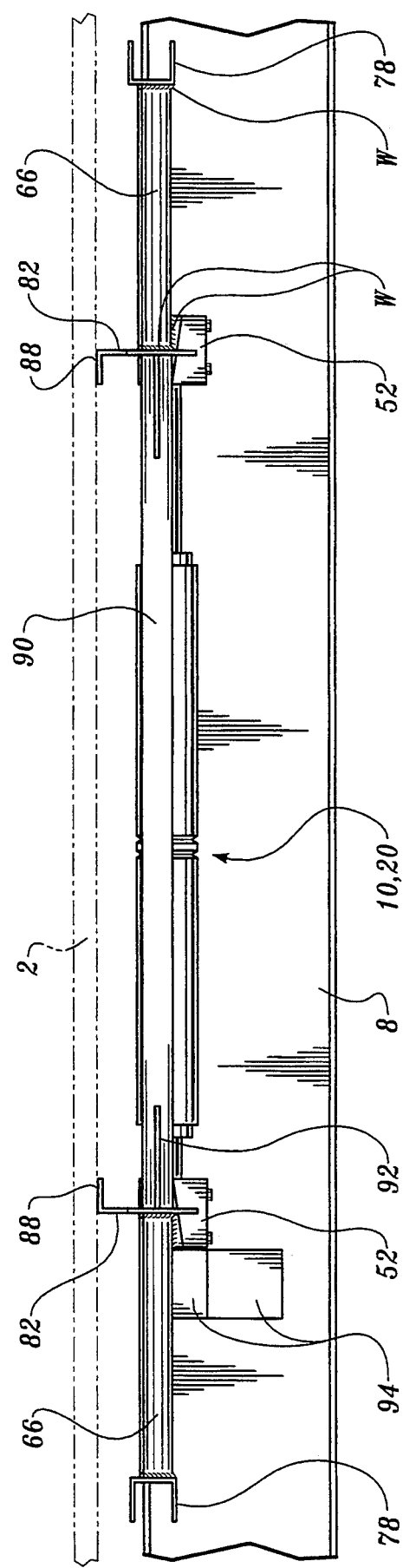
FIG. 7 is a side elevational view of the drive frame assembly shown in FIG. 6 and a portion of one of the main frame beams to which the assembly is attached.
Figure 8:
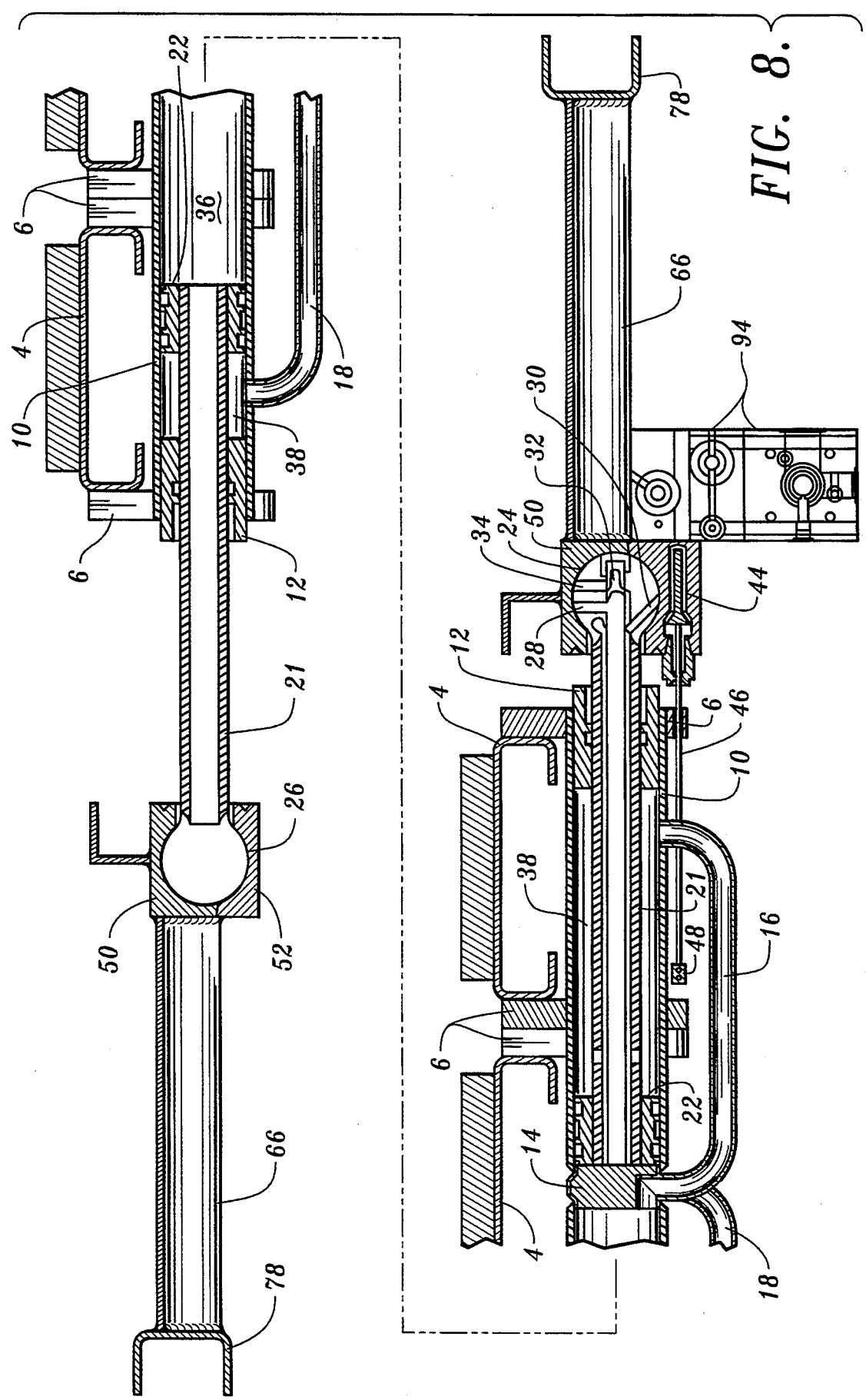
FIG. 8 is a partially schematic sectional view of the drive frame assembly shown in FIGS. 6 and 7 and additional portions of the conveyor.

The details of one of the motors 10, 20 are shown partially schematically in FIG. 8. Each half of the motor 10, 20 includes a piston rod 21 having at its opposite ends a piston head 22 and a ball end 24, 26. Each ball end 24, 26 is mounted onto the drive frame by means of a ball block 50, 52, as described further below. The piston heads 22 are received into their respective halves of the cylinder 10. The two portions of the cylinder 10 are separated by a divider wall 14. In each half of the cylinder 10, there is a first chamber 36 and a second annular chamber 38. The first chamber 36 of each half of the cylinder is connected by a conduit 16, 18 to the second annular chamber 38 of the other half of the cylinder. This achieves the desired increase in the effective pressure surface area of the motor and also produces equal pressure surfaces for movement of the cylinder in both directions. The piston rod 21 extends from the ball end 24, 26 into the cylinder. The end of the cylinder through which the rod 21 extends is closed by a cylinder head 12.

One of the ball ends 24 is provided with a plurality of passageways for delivering hydraulic pressure to and returning hydraulic pressure from the motor 10, 20. These passageways are shown in FIG. 8 and schematically in FIG. 11. The other ball end 26 is a closed blind end. The active ball end 24 has a first passageway 28 which communicates with the first chamber 36 of the corresponding cylinder portion and, via conduit 18, with the annular chamber 38 in the other half of the cylinder. Hydraulic pressure introduced into passageway 28 causes the cylinder to move to the left (as shown in FIG. 8). The ball end 24 has a second passageway 30 which communicates with the annular chamber 38 of its corresponding cylinder section and, via conduit 16, with the chamber 36 in the other cylinder section. Hydraulic pressure introduced into the passageway 30 causes the cylinder 10 to move to the right (as shown in FIG. 8). The motor 10, 20 is preferably provided with an internal check valve 32 and associated passageway 34 of the type disclosed in my co-pending application Ser. No. 08/054,530, filed Apr. 28, 1993, and entitled "Internal Check Valve". The description of the internal check valve in that application beginning at page 4, line 36 and ending at page 7, line 16, and the drawings referred to therein are incorporated herein by reference.

The drive system shown in FIG. 8 also includes a check valve 44 of the type disclosed and claimed in my U.S. Pat. No. 5,255,712. The valve 44 has a wire cable or rod 46 extending therefrom and terminating in an abutment 48. Movement of the cylinder 10 all the way to the left (as shown) causes an abutment on the cylinder, for example a portion of the clamp 6, to contact the abutment 48 to open the check valve 44. The drive system also includes a number of additional valves and controls that are housed in a manifold 94, shown in FIGS. 6–8. Valve 44 and the components housed in manifold 94 do not form a part of the present invention. An example of a suitable combination of additional drive system elements is disclosed in my U.S. Pat. No. 5,193,661.

The piston-cylinder drive units are mounted on the drive frame of the drive frame assembly. The drive frame includes, at each of its opposite ends, a transverse drive frame member 64. The transverse drive frame members 64 are connected together by a pair of laterally spaced, longitudinally extending beams 90. These beams 90 may, for example, be formed by square tubing. Each transverse member 64 comprises a generally horizontal metal plate 66 having a central portion and opposite side portions 74 projecting laterally outwardly from the central portion. The side portions 74 terminate in outer ends 76.

The central portion of the transverse drive frame member 64 is stiffened to resist bending. The central portion is preferably provided with a plurality of ribs extending longitudinally of the conveyor into which the assembly is incorporated. In the preferred embodiment shown in the drawings, the ribs are formed by a plurality of corrugations 68 formed in the central portion of the metal plate 66. The stiffening of the central portion is accomplished by the inclusion in the drive frame member 64 of two longitudinally spaced apart transverse beams 78, 80 and by the ball blocks 50, 52. A first transverse beam 78 extends along the outer end of the metal plate 66 and is secured to outer end edge portions of the central portion, including the corrugations 68, by suitable means, such as welding W. This beam 78 has a C-shaped cross section. The other transverse beam 80 has an L-shaped cross section and extends along the inner edge of the plate 66. The beam 80 has a horizontal leg 88 and a vertical leg 82. The vertical leg 82 is secured, such as be welding W, to the central portion of the plate 66, as shown in FIGS. 1, 3, 5, and 6. The lateral side portions of the vertical leg 82 taper to the laterally outer ends of the beam 80 to provide clearance for mounting the drive assembly onto a main frame, as described below. The tapering of the leg 82 is indicated by the reference numeral 84. The longitudinal beams 90 that interconnect the two transverse drive frame members 64 are welded to the vertical leg 82, and gussets 92 are provided at the connection to reinforce the connection.

The central portion of the metal plate 66 is provided with a cut-out 70, best seen in FIG. 3. The vertical leg 82 of the beam 80 has a corresponding cut-out 86. The cut-outs 70, 86 in the metal plate 66 and the beam leg 82 are aligned and provide a recess for receiving a set of three ball blocks 50, 52. The three ball blocks 50, 52 are welded together and to the inner end portions 72 of the corrugations 68 that confront the drive units and form the inner edge of the recess. This provides a secure mounting of the respective drive unit ends to the transverse drive frame members 64. Along the inner edge of each transverse drive frame member 64, the L-shaped beam 80 and the ball blocks 50, 52 cooperate to provide the desired stiffening. In effect, the two components 50, 52 and 80 together form a transverse beam.

Each of the opposite side portions 74 of the metal plate 66 of each transverse drive frame member 64 is free of connection to the stiffening members, i.e. the beams 78, 80 and the ball blocks 50, 52. This allows the side portions 74 to be bendable with respect to the central portion of the plate 66, the stiffening members 78, 80, the ball blocks 50, 52, and the motors 10, 20 mounted thereby.

Each ball block 50, 52 preferably has essentially the same configuration as the ball block disclosed in my co-pending application, Ser. No. 08/054,533, filed Apr. 28, 1993, and entitled, "Ball Block for Mounting Linear Motor". Portions of such application are incorporated herein by reference. Such portions include FIGS. 3, 4, and 7–11 and the text at page 8, line 3 through page 10, line 31, and page 13, lines 12–24. Since the details of the structure of the ball block do not form a part of the present invention, the ball block will only be briefly described herein.

Referring to FIGS. 9–11, each ball block 50, 52 includes an upper housing portion 50 and a lower housing portion 52. Unlike the ball block shown in application Ser. No. 08/054,533, the ball block in the conveyor drive of the invention preferably has the overall square housing configuration shown in the drawings herein. The two housing portions are secured together by means of fasteners 54. The upper housing portion 50 has an outer wall 56 which is secured to the confronting end portions 72 of the corrugations 68, as shown in FIGS. 1, 3, and 5–8. The axis of each drive unit extends through the outer wall 56 and is aligned with the corrugations 68 to efficiently transmit loads to the transverse drive frame member 64 and relieve loads on the fasteners 54, as described in detail in my co-pending application. The corresponding ball end 24, 26 is received into a cavity formed by each ball block 50, 52. The piston rod 21 extends from the ball end 24, 26 out of the ball block housing 50, 52 through a passageway 58. A seal 60 surrounds the rod 21. Preferably, a flange 62 extends upwardly from the lower housing portion 52, as shown in FIG. 9. The flange 62 cooperates with the outer wall 56 to form the socket into which the ball end 24, 26 is received. On one end of the frame, each lower housing portion 52 includes a plurality of passageways for delivering fluid pressure to, and returning fluid pressure from, the ball end 24 received in the ball block 50, 52. The passageways communicate with passageways 28, 30, 34 in the ball end 24.

The present invention encompasses a method of mounting a reciprocating slat conveyor on a structure as well as the conveyor itself and the drive frame assembly thereof. In the method, the drive frame assembly of the conveyor is mounted by attaching it to laterally spaced apart portions of a main frame of the structure. The method is preferably practiced using the preferred embodiment of the drive frame assembly shown in the drawings and described above. The central portion of the metal plate 66 is stiffened as described above, and the mounting end parts, i.e. the ball blocks 50, 52, of the drive units are secured to the central portion. The drive frame assembly is positioned on the structure with the outer ends 76 of the metal plate side portions 74 positioned over the laterally spaced apart portions of the main frame. As shown in FIGS. 3–5 and 7, these laterally spaced portions are upper portions of the upper flanges of two I-beams 8.

When the assembly is mounted onto an existing structure, there commonly is some variation in the vertical spacing of the drive units relative to the upper flanges of the I-beams 8. The upper flanges may either be slightly higher or slightly lower than the unbent position of the metal plate side portions 74. FIG. 4 illustrates the bending of the side portions 74 relative to the central portion in order to accommodate the variation in vertical spacing. The bending of the side portions 74 brings the outer ends 76 of the side portions 74 into engagement with the spaced apart upper flange portions of the I-beams 8. Then, the outer ends 76 are welded to the I-beam flanges to secure the drive frame assembly to the main frame of the structure. Thus, the freedom of the side portions 74 to bend relative to the central portion of the metal plate 66 and the stiffening elements of the transverse drive frame member 64 permit the drive frame assembly to be easily installed in any of a number of structures without requiring difficult or complicated procedures or additional apparatus in order to compensate for variations in the vertical positioning of main frame elements of the structure.

The method of mounting the conveyor also includes positioning the conveyor slats 2 above the drive units, the main frame, and the transverse drive frame members 64. Each set of conveyor slats 2 is connected to the movable cylinder portion 10 of its corresponding drive unit. As illustrated, this is accomplished by engaging the cylinder 10 with a pair of clamps 6 that are secured to a transverse drive beam 4. The slats 2 in the set are then, in turn, positioned above the transverse drive beam 4 and secured thereto. Once the conveyor has been installed, movement of the conveyor slats 2 during operation of the conveyor may be guided and supported by various known types of guide beams and bearings.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A reciprocating slat conveyor, comprising:
   at least two sets of conveyor slats;
   a conveyor drive for moving the conveyor slats in a first direction, for conveying a load, and for retracting the conveyor slats in the opposite direction; said conveyor drive including a separate piston-cylinder drive unit for each set of conveyor slats; said drive units being positioned below the conveyor slats; and each said drive unit including a movable portion connected to its set of conveyor slats and a fixed portion including a mounting end part;
   a main frame below the conveyor slats; and
   a transverse drive frame member below the conveyor slats, connected to the main frame; said frame member including a generally horizontal metal plate formed to include a plurality of corrugations extending longitudinally of the conveyor generally in line with the drive units, and said corrugations including end portions confronting and connected to the mounting end parts of the drive units so that said corrugations carry axial drive forces generated by the drive units.

2. A reciprocating slat conveyor according to claim 1, wherein said metal plate includes opposite side portions projecting laterally outwardly from the corrugations, each said side portion including an outer end, and said outer ends being connected to portions of the main frame.

3. A reciprocating slat conveyor according to claim 2, wherein the side portions of the metal plate are bendable in position relative to the corrugations to permit adjustment of the vertical position of said outer ends to accommodate variations in vertical spacing of the drive units relative to said portions of the main frame.

4. A reciprocating slat conveyor according to claim 3, wherein the transverse drive frame member includes a transverse beam at at least one end of the corrugations, firmly connected to the corrugations, for stiffening the corrugations; said side portions of the metal plate being free of connection to the transverse beam so that they are bendable in position relative to the corrugations and the transverse beam.

5. A reciprocating slat conveyor according to claim 3, wherein the transverse drive frame member includes a pair of longitudinally spaced apart transverse beams, wherein the metal plate is positioned longitudinally between the two transverse beams, and wherein the ends of the corrugations are firmly connected to the transverse beams but the side portions of the metal plate are free of connection with the transverse beams so that said side portions are bendable in position relative to both the corrugations and the transverse beams.

6. A reciprocating slat conveyor according to claim 1, in which said mounting end part of each drive unit comprises a ball end, and which comprises a ball block for each drive unit, each said ball block defining a cavity into which said ball end of the corresponding drive unit is received, and each said ball block being firmly connected to said end portions of the corrugations to secure the drive unit to the transverse drive frame member.

7. A reciprocating slat conveyor according to claim 6, wherein each said ball block includes at least one passageway for delivering fluid pressure to, and returning fluid pressure from, said ball end.

8. A reciprocating slat conveyor according to claim 6, wherein each said ball block includes a plurality of passageways for delivering fluid pressure to, and returning fluid pressure from, said ball end, for moving the conveyor slats in said first direction and retracting the conveyor slats in said opposite direction.

9. A reciprocating slat conveyor according to claim 8, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said end portions of the corrugations of the second transverse drive frame member to secure the drive unit thereto.

10. A reciprocating slat conveyor according to claim 6, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said end portions of the corrugations of the second transverse drive frame member to secure the drive unit thereto.

11. A reciprocating slat conveyor according to claim 6, wherein said metal plate includes opposite side portions projecting laterally outwardly from the corrugations, each said side portion including an outer end, and said outer ends being connected to portions of the main frame.

12. A reciprocating slat conveyor according to claim 11, wherein the side portions of the metal plate are bendable in position relative to the corrugations to permit adjustment of the vertical position of said outer ends to accommodate variations in vertical spacing of the drive units relative to said portions of the main frame.

13. A reciprocating slat conveyor according to claim 12, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said end portions of the corrugations of the second transverse drive frame member to secure the drive unit thereto.

14. A reciprocating slat conveyor according to claim 12, wherein the transverse drive frame member includes a transverse beam firmly connected to end portions of the corrugations opposite said ball blocks for stiffening the corrugations; said side portions of the metal plate being free of connection to the transverse beam so that they are bendable in position relative to the corrugations, the ball blocks, and the transverse beam.

15. A reciprocating slat conveyor according to claim 14, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to end portions of the corrugations of the second transverse drive frame member to secure the drive unit thereto.

16. A reciprocating slat conveyor according to claim 15, wherein, at one of said ends of each said fixed portion, said ball block includes a plurality of passageways for delivering fluid pressure to, and returning fluid pressure from, the corresponding ball end, for moving the conveyor slats in said first direction and retracting the conveyor slats in said opposite direction.

17. A reciprocating slat conveyor, comprising:
at least two sets of conveyor slats;
a conveyor drive for moving the conveyor slats in a first direction, for conveying a load, and for retracting the conveyor slats in the opposition direction; said conveyor drive including a separate piston-cylinder drive unit for each set of conveyor slats; said drive units being positioned below the conveyor slats; and each said drive unit including a movable portion connected to its set of conveyor slats and a fixed portion having a mounting end part;
a main frame below the conveyor slats; and
a transverse drive frame member below the conveyor slats, connected to the main frame; said frame member including a generally horizontal metal plate having a central portion provided with a plurality of strengthening ribs extending longitudinally of the conveyor, and opposite side portions extending laterally outwardly from the central portion, each to an outer end, said outer ends being connected to the main frame;
wherein said mounting end parts of the drive units are connected to the-central portion of the metal plate, to place the drive units in substantial axial alignment with the ribs on the central portion of the metal plate; and
wherein the opposite side portions of the metal plate are bendable in position relative to the central portion of the metal plate to permit adjustment of the vertical position of said outer ends to accommodate variations in vertical spacing of the drive units relative to portions of the main frame that are connected to said outer ends.

18. A reciprocating slat conveyor according to claim 17, wherein the metal plate has opposite edge portions extending between said side portions, and the transverse drive frame member includes a transverse beam extending along at least one of said edge portions and firmly connected to said central portion to stiffen said central portion; said side portions being free of connection to the transverse beam so that they are bendable in position relative to said central portion and the transverse beam.

19. A reciprocating slat conveyor according to claim 17, wherein the transverse drive frame member includes a pair of longitudinally spaced apart transverse beams, the metal plate is positioned longitudinally between the two transverse beams, and said central portion of the metal plate is firmly connected to the transverse beams but said side portions are free of connection with the transverse beams so that said side portions are bendable in position relative to both said central portion and the transverse beams.

20. A reciprocating slat conveyor according to claim 17, in which said mounting end part of each drive unit comprises a ball end, and which comprises a ball block for each drive unit, each said ball block defining a cavity into which said ball end of the corresponding drive unit is received, and each said ball block being firmly connected to said central portion of the metal plate to secure the drive unit to the transverse drive frame member.

21. A reciprocating slat conveyor according to claim 20, wherein each said ball block includes at least one passageway for delivering fluid pressure to, and returning fluid pressure from, said ball end.

22. A reciprocating slat conveyor according to claim 20, wherein each said ball block includes a plurality of passageways for delivering fluid pressure to, and returning fluid pressure from, said ball end, for moving the conveyor slats in said first direction and retracting the conveyor slats in said opposite direction.

23. A reciprocating slat conveyor according to claim 22, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said central portion of the metal plate of the second transverse drive frame member to secure the drive unit thereto.

24. A reciprocating slat conveyor according to claim 20, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said central portion of the metal plate of the second transverse drive frame member to secure the drive unit thereto.

25. A reciprocating slat conveyor according to claim 20, wherein the transverse drive frame member includes a transverse beam firmly connected to end portions of said central portion of the metal plate opposite said ball blocks for stiffening said central portion; said side portions of the metal plate being free of connection to the transverse beam so that they are bendable in position relative to said central portion and the transverse beam.

26. A reciprocating slat conveyor according to claim 25, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said central portion of the metal plate of the second transverse drive frame member to secure the drive unit thereto.

27. A reciprocating slat conveyor according to claim 26, wherein, at one of said ends of each said fixed portion, said ball block includes a plurality of passageways for delivering fluid pressure to, and returning fluid pressure from, the corresponding ball end, for moving the conveyor slats in said first direction and retracting the conveyor slats in said opposite direction.

28. A reciprocating slat conveyor, comprising:
a plurality of conveyor slats;
a conveyor drive for moving the conveyor slats in a first direction, for conveying a load, and for retracting the conveyor slats in the opposite direction; said conveyor drive including a piston-cylinder drive unit positioned below the conveyor slats, said drive unit including a movable portion connected to the conveyor slats and a fixed portion having a mounting end part;
a main frame below the conveyor slats; and
a transverse drive frame member below the conveyor slats, connected to the main frame; said frame member having a central portion and opposite side portions extending laterally outwardly from the central portion, each to an outer end;
wherein said mounting end part of the drive unit is connected to the central portion of the transverse drive frame member; and
wherein the opposite side portions of the transverse drive frame member are bendable in position relative to the central portion of the transverse drive frame member to permit adjustment of the vertical position of said outer ends to accommodate variations in vertical spacing of the drive unit relative to portions of the main frame that are connected to said outer ends.

29. The conveyor of claim 28, in which said transverse drive frame member comprises a generally horizontal metal plate, and a transverse beam secured to end portions of a central portion of said plate, said plate having opposite side portions extending laterally outwardly from said central portion of said plate and free from connection with the transverse beam to be bendable relative to said central portion of said plate.

30. A drive frame assembly for a reciprocating slat conveyor, comprising:
a drive frame including first and second transverse drive frame members, said frame members being longitudinally spaced apart; each said frame member including a generally horizontal metal plate having a central portion and opposite side portions extending laterally outwardly from the central portion, each to an outer end; and each said frame member including stiffening portions that stiffen said central portion; and
a conveyor drive for moving conveyor slats in a first direction, for conveying a load, and for retracting the conveyor slats in the opposition direction; said conveyor drive including a plurality of separate piston-cylinder drive units; each said drive unit including a movable portion connectable to a set of conveyor slats, and a fixed portion having a first mounting end part and a second mounting end part opposite said first mounting end part; and said first and second mounting end parts being connected to said central portions of said metal plates of said first and second frame members, respectively;
wherein the opposite side portions of each said metal plate are bendable in position relative to the central portion of the metal plate to permit adjustment of the vertical positions of said outer ends relative to the drive units when the assembly is mounted on a structure by securing said outer ends to portions of the structure.

31. The assembly of claim 30, wherein said central portion of each said metal plate has a plurality of strengthening ribs extending longitudinally of the assembly, and said drive units are in substantial axial alignment with said ribs.

32. The assembly of claim 31, wherein said central portion of each said metal plate has a plurality of corrugations that form said ribs, and each said transverse drive frame member includes a transverse beam firmly connected to end portions of said corrugations to stiffen said central portion of said metal plate, said side portions of said plate being free of connection with the transverse beam so that said side portions are bendable in position relative to both the corrugations and the transverse beam.

33. The assembly of claim 32, in which each said mounting end part comprises a ball end; and which comprises a ball block for each said ball end, each said ball block defining a cavity into which the corresponding ball end is received, and each said ball block being firmly connected to end portions of the corrugations of one of said transverse drive frame members, longitudinally opposite said transverse beam, to secure each said drive unit to both of said transverse drive frame members.

34. The assembly of claim 31, in which each said mounting end part comprises a ball end; and which comprises a ball block for each said ball end, each said ball block defining a cavity into which the corresponding ball end is received, and each said ball block being firmly connected to end portions of the ribs of one of said drive frame members, to secure each said drive unit to both of said drive frame members.

35. A method of mounting a reciprocating slat conveyor on a structure, said structure including a main frame having laterally spaced apart portions, comprising:
providing a conveyor drive including a plurality of separate piston-cylinder drive units, each said drive unit including a movable portion and a fixed portion having a mounting end part;
providing a drive frame including a transverse drive frame member having a central portion and opposite side portions extending laterally outwardly from said central portion, each to an outer end;
stiffening said central portion, but allowing said side portions to be bendable in position relative to said central portion to permit vertical adjustment of said outer ends relative to said central portion;
connecting the mounting end parts of the drive units to said central portion;
connecting said outer ends to said spaced apart portions of the main frame, including positioning said outer ends vertically to bring them into engagement with said spaced apart portions;
providing a plurality of sets of conveyor slats, one set for each drive unit, and positioning said conveyor slats above said drive units, the main frame, and the transverse drive frame member; and
connecting each set of conveyor slats to the movable portion of its drive unit.

36. The method of claim 35, wherein the step of providing said transverse drive frame member comprises providing a generally horizontal metal plate, and the steps of stiffening said central portion and allowing said side portions to be bendable comprise securing a transverse beam to end portions of a central portion of the metal plate and maintaining opposite side portions of the metal plate free from connection with the transverse beam so that said opposite side portions of the metal plate are bendable relative to said central portion of the metal plate and the drive units.

37. The method of claim 36, in which the step of stiffening said central portion of the transverse drive frame member comprises providing the central portion of the metal plate with a plurality of corrugations extending longitudinally generally in line with the drive units, and connecting the transverse beam to end portions of the corrugations.

38. The method of claim 35, in which said mounting end part of each drive unit comprises a ball end, and in which the step of connecting the mounting end parts of the drive units to said central portion of the transverse drive frame member comprises providing a ball block for each drive unit, positioning the ball end of each drive unit into a cavity in the corresponding ball block, and firmly connecting each ball block to said central portion.

39. The method of claim 38, comprising providing each said ball block with a plurality of passageways for delivering fluid pressure to, and returning fluid pressure from, said ball end, for moving the conveyor slats in a first direction and retracting the conveyor slats in an opposite direction.

40. The method of claim 39, comprising providing the fixed portion of each drive unit with a second ball end, providing the drive frame with a second said transverse drive frame member and spacing said drive frame members apart, providing a second ball block corresponding to each said second ball end, positioning each second ball end into a cavity in the corresponding second ball block, firmly connecting each second ball block to the central portion of the second transverse drive frame member to secure the drive unit thereto, and connecting the outer ends of the opposite side portions of the second transverse drive frame member to laterally spaced apart portions of the main frame.

41. The method of claim 38, comprising providing the fixed portion of each drive unit with a second ball end, providing the drive frame with a second said transverse drive frame member and spacing said drive frame members apart, providing a second ball block corresponding to each said second ball end, positioning each second ball end into a cavity in the corresponding second ball block, firmly connecting each second ball block to the central portion of the second transverse drive frame member to secure the drive unit thereto, and connecting the outer ends of the opposite side portions of the second transverse drive frame member to laterally spaced apart portions of the main frame.

42. The method of claim 38, in which the step of providing a drive frame includes providing a transverse drive frame member having a metal plate and a transverse beam; and which comprises firmly connecting said ball blocks to end portions of a central portion of the metal plate, firmly connecting the transverse beam to end portions of the central portion of the metal plate opposite said ball blocks for stiffening the central portion of the metal plate, and leaving opposite side portions of the metal plate free of connection to the transverse beam and the ball blocks so that they are bendable in position relative to the central portion of the metal plate, the ball blocks, and the transverse beam.

43. The method of claim 42, comprising providing the fixed portion of each drive unit with a second ball end, providing the drive frame with a second said transverse drive frame member and spacing said drive frame members apart, providing a second ball block corresponding to each said second ball end, positioning each second ball end into a cavity in the corresponding second ball block, firmly connecting each second ball block to the central portion of the second transverse drive frame member to secure the drive unit thereto, and connecting the outer ends of the opposite side portions of the second transverse drive frame member to laterally spaced apart portions of the main frame.

44. The method of claim 43, comprising providing each said ball block that is connected to a first one of said transverse drive frame members with a plurality of passageways for delivering fluid pressure to, and returning fluid pressure from, the corresponding ball end, for moving the conveyor slats in a first direction and retracting the conveyor slats in an opposite direction.

45. A method of mounting a reciprocating slat conveyor on a structure, said structure including a main frame having laterally spaced apart portions, comprising:

providing a conveyor drive including a piston-cylinder drive unit having a movable portion and a fixed portion with a mounting end part;

providing a drive frame including a transverse drive frame member having a central portion and opposite side portions extending laterally outwardly from said central portion, each to an outer end;

stiffening said central portion, but allowing said side portions to be bendable in position relative to said central portion to permit vertical adjustment of said outer ends of said side portions relative to said central portion;

connecting the mounting end part of the drive unit to said central portion;

connecting said outer ends of said side portions to said spaced apart portions of the main frame, including positioning said outer ends vertically to bring them into engagement with said spaced apart portions;

providing a plurality of conveyor slats, and positioning the slats above the drive unit, the main frame, and the transverse drive frame member; and connecting the conveyor slats to the movable portion of the drive unit.

46. A drive frame assembly for a reciprocating slat conveyor, comprising:

a drive frame including first and second longitudinally spaced transverse drive frame members, and a pair of laterally spaced longitudinal drive frame members extending between and connecting said transverse drive frame members;

a conveyor drive for moving conveyor slats in a first direction, for conveying a load, and for retracting the conveyor slats in the opposite direction; said conveyor drive including a plurality of separate piston-cylinder drive units; each said drive unit including a movable portion connectable to a set of conveyor slats, and a fixed portion having a first ball end and a second ball end opposite said first ball end; and a ball block for each said ball end, each said ball block defining a cavity into which the corresponding ball end is received, and each said ball block being firmly connected to end portions of one of said transverse drive frame members, to secure each said drive unit to both of said transverse drive frame members.

47. The assembly of claim 46, in which each said transverse drive frame member includes a generally horizontal metal plate having a central portion and opposite side portions extending laterally outwardly from the central portion, each to an outer end, and stiffening portions that stiffen said central portion; said ball blocks being connected to said central portions of said metal plates, and said side portions of each said metal plate being bendable in position relative to the central portion of the metal plate to permit adjustment of the vertical positions of said outer ends relative to the drive units when the assembly is mounted on a structure by securing said outer ends to portions of the structure.

48. The assembly of claim 47, wherein said central portion of each said metal plate has a plurality of strengthening ribs extending longitudinally of the assembly, and said drive units are in substantial axial alignment with said ribs.

49. The assembly of claim 48, wherein said central portion of each said metal plate has a plurality of corrugations that form said ribs, and each said transverse drive frame member includes a transverse beam firmly connected to end portions of said corrugations to stiffen said central portion of said metal plate, said side portions of said plate being free of connection with the transverse beam so that said side portions are bendable in position relative to both the corrugations and the transverse beam.

* * * * *

UNITED STATES PATENT AND TRADEMARK OFFICE
CERTIFICATE OF CORRECTION

PATENT NO. : 5,390,781

DATED : February 21, 1995

INVENTOR(S) : Raymond Keith Foster

It is certified that error appears in the above-indentified patent and that said Letters Patent is hereby corrected as shown below:

On the cover, under "[63] Related U.S. Application Data", "5,360,054" should be -- 5,350,054 --.

Column 1, line 9, "5,525,763" should be -- 5,325,763 --.

Column 4, line 55, delete "the", first occurrence.

Column 7, line 9, "be" should be -- by --.

Claim 17, col. 11, line 20, "opposition" should be -- opposite --.

Cl. 17, col. 11, line 40, "the-central" should be -- the central --.

UNITED STATES PATENT AND TRADEMARK OFFICE
CERTIFICATE OF CORRECTION

PATENT NO. : 5,390,781

DATED : February 21, 1995

INVENTOR(S) : Raymond Keith Foster

It is certified that error appears in the above-indentified patent and that said Letters Patent is hereby corrected as shown below:

Claim 30, col. 13, line 52, "opposition" should be -- opposite --.

Signed and Sealed this

Twenty-seventh Day of August, 1996

Attest:

BRUCE LEHMAN

Attesting Officer     Commissioner of Patents and Trademarks